United States Patent [19]
Ristow

[11] Patent Number: 5,094,043
[45] Date of Patent: Mar. 10, 1992

[54] WATERPROOF ROOF

[76] Inventor: Delano H. Ristow, 10015 Steinthal Rd., Kiel, Wis. 53042

[21] Appl. No.: 232,026

[22] Filed: Aug. 15, 1988

[51] Int. Cl.⁵ ............................................... E04D 5/14
[52] U.S. Cl. .......................................... 52/63; 52/222; 52/747
[58] Field of Search .................... 52/410, 63, 222, 465, 52/544, 545, 549, 551, 462, 747

[56] References Cited

U.S. PATENT DOCUMENTS 3,895,468  7/1975  Bernstein ............................. 52/222
4,519,172  5/1985  Ristow .................................. 52/465
4,586,301  5/1986  Hickman ............................. 52/410
4,677,795  7/1987  Matthews et al. .................... 52/222

FOREIGN PATENT DOCUMENTS 2302500  7/1973  Fed. Rep. of Germany ......... 52/63
2228923  12/1974  France .................................. 52/222
162851  4/1958  Sweden ................................. 52/545
219994  4/1968  Sweden ................................. 52/222
1384872  2/1975  United Kingdom ................. 52/828

Primary Examiner—Michael Safavi
Attorney, Agent, or Firm—Foley & Lardner

[57] ABSTRACT

A waterproof roof including a supporting roof structure and a hold down assembly for securing a generally continuous sheathing member to the supporting roof structure. The hold down assembly including a number of elongate members supported in a parallel spaced relation of the supporting roof structure with the sheathing member overlying the elongate members. The elongate members each including a raised center portion having a channel on each side. The sheathing member is locked in the channels by cables aligned in the channels and trapped therein by deforming the raised center portion.

8 Claims, 2 Drawing Sheets

WATERPROOF ROOF

BACKGROUND OF THE INVENTION

1. Field of the Invention

This invention relates to waterproof roofs, and, more particularly, to an assembly for securing a generally elastic sheeting member to the supporting roof structure.

2. Description of the Prior Art

This application relates to an improvement in my U.S. Letters Pat. No. 4,519,172 issued on May 28, 1985 and entitled, "Waterproof Roof". The roof described in the patent included an elastic sheathing member which was secured to the supporting roof structure by first and second elongate members. The first elongate member being secured to the supporting roof structure and the second elongate member being secured to the first elongate member with the elastic sheathing member secured between the first and second elongate members. The second elongate member is secured to the first elongate member by screws which pass through the sheathing member in order to secure the second member to the first member. The penetration of the sheathing member by the screws had to be sealed by providing a waterproof caulk or tape attached to the underside of the first elongate member.

SUMMARY OF THE INVENTION

The present invention relates to a waterproof roof for a generally planar supporting roof structure which does not require penetration of the sheathing member. An elongate member is provided for securing the elastic sheathing member to the supporting roof structure. The elongate member having a raised deformable center section which defines channels on each side of the raised center section. The sheathing member is folded into the channels by an elongate element to hold the elastic sheathing member against the sides of the center section. The center section is deformed to trap the elongate elements in the channels with the sheathing member sandwiched between the elongate element and the raised center section.

One of the principal features of this invention is the provision of a hold down assembly that does not require penetration of the elastic sheathing member.

Another principal feature of the invention is the provision of a hold down assembly which is simple to install and provides greater reliability in service.

Another feature of the invention is the provision of a hold down assembly for an elastic sheathing member that takes in any slack in the sheathing member at the time of installation.

Other features and advantages of the embodiments of the invention will become apparent upon review of the following drawings, detailed description and the appended claims.

Figure 1:
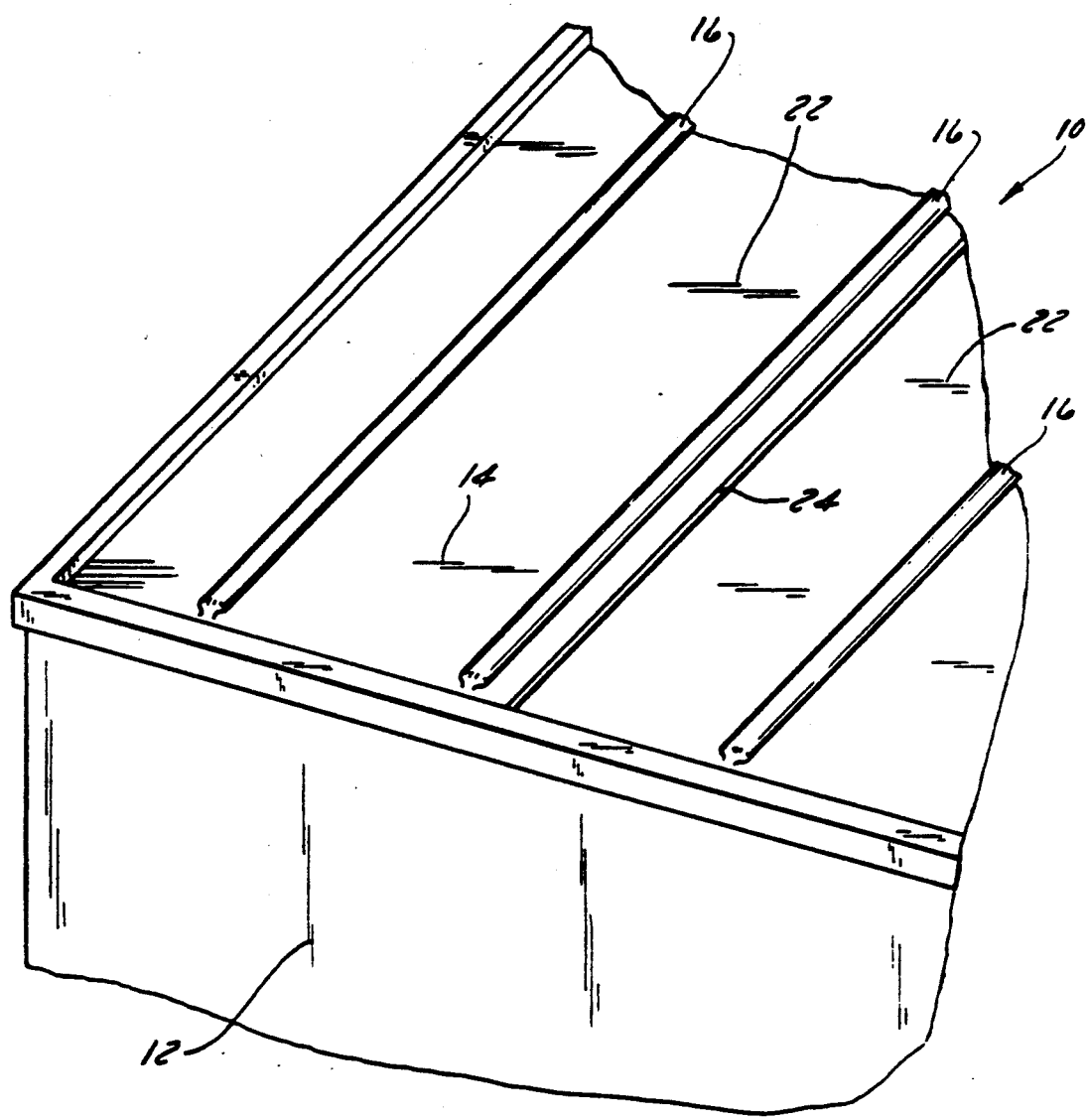
FIG. 1 is a partial perspective view of a waterproof roof which embodies the hold down assembly according to the invention.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood, that the phraseology and terminology employed herein is for the purposes of description and should not be regarded as limiting.

DETAILED DESCRIPTION OF THE PREFERRED EMBODIMENT

This invention relates to a waterproof roof 10 for a flat roof structure 12. The roof 10 generally includes a continuous elastic sheathing member 14 and hold down assembly 16 for securing the sheathing member 14 to the roof structure 12. Each assembly 16 includes an elongate member 18 and a pair of elongate elements 20 for each member 18.

The elongate elements 20 can be in the form of flexible cables or plastic rods. A stranded cable coated with a plastic material has been used successfully for this purpose. The elongate members 18 provide the means for securing the sheathing member 14 to the roof structure 12 and are mounted in a parallel spaced relation on the supporting roof structure 12. The supporting roof structure 12 can be generally horizontal as shown in FIG. 1 or inclined or domed. The contour of the supporting roof structure 12 and wind uplift considerations determine the arrangement and spacing of the elongate members 18.

The sheathing member 14 is elastic so as to provide a flexible waterproof means for preventing water infiltration through the roof structure. The sheathing member 14 can be made of either ethylene propylene dioxide methane (EPDM) or poly vinyl chloride (PVC) or any other suitable material for elastic membranes, the choice of material depending on the conditions expected for the waterproof roof 10. The sheathing member 14 can also be reinforced with mesh if desired.

The sheathing member 14 is formed by a plurality of sheathing member segments 22 which are attached by overlapping the adjacent edges and applying an appropriate glue or other connecting means to secure the edges together to form a seam 24. If the seams 24 on the sheathing member segments 22 come together over the elongate members 18, the overlapped joints at the seams 24 can be attached to the hold down assembly as described hereinafter.

Figure 2:
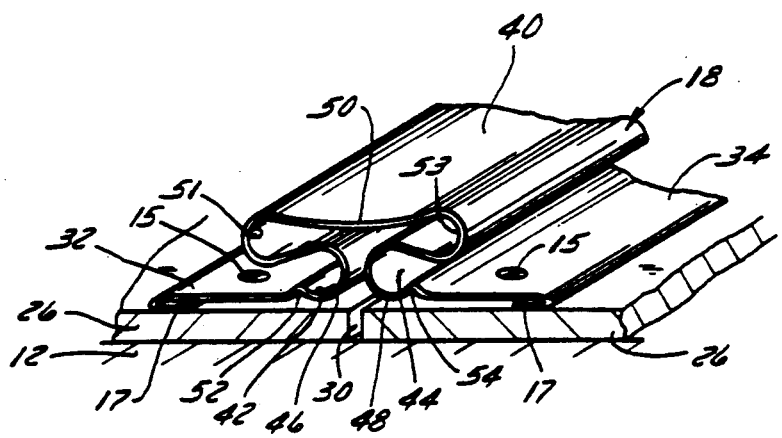
FIG. 2 is a perspective view of the end of the hold down assembly.
Figure 3:
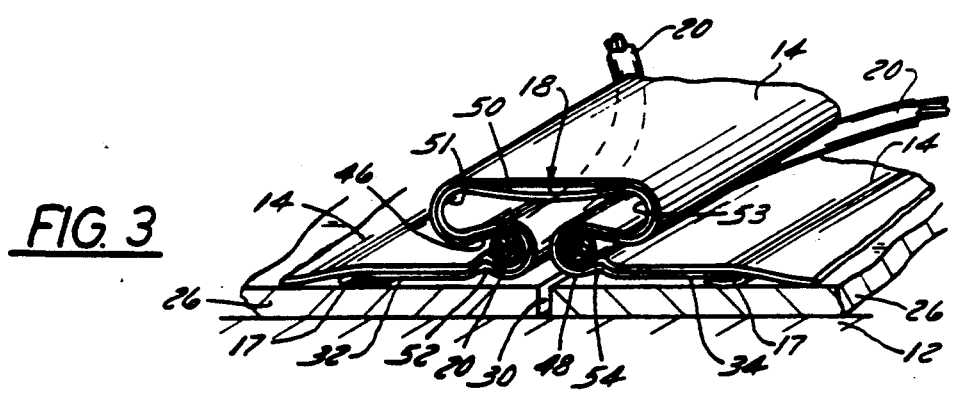
FIG. 3 is a perspective view showing the position of the cables prior to assembly.

The supporting roof structure 12 can be of any material suitable for a waterproof roof 10 and can include an overlying layer of insulation panels 26. As illustrated in FIG. 2, the elongate members 18 can also provide a convenient means for covering gaps 30 between adjacent insulation panels 26 on the roof structure 12.

Each of the elongate members 18 includes a first portion 32 and a second portion 34, both of which are attached to the supporting roof structure 12 by means of deck screws 15. This type of screw has been approved for this use by Factory Mutual for maximum wind uplift forces. The outer edges 17 of the first 32 and second 34 portions are lapped away from sheathing member 14 to prevent injury to the sheathing member 14. The elongate member 18 also includes a raised central portion 40 which is formed integral with the first portion 32 and second portion 34 to provide a point of attachment above the plane of the horizontal roof structure 12 for the elongate member 18. Although various forms are possible for the raised central portion 40, the raised central portion 40 is in the form of a "T".

In this regard, it should be noted that the raised portion 40 includes a pair of channels 42 and 44 formed by a pair of semi-circular portions 46 and 48 which are formed integral with the first and second portions 32 and 34, respectively. The top of the raised section 40 has a convex section 50 which is integral with the circular edges 51 and 53 which are formed as a continuation of the semi-circular portions 46 and 48, respectively.

The sheathing member 14 is secured to the elongate members 18 by initially rolling the sheathing over the top of the raised portion 40. One of the elongate elements 20 is then pushed into the channel 42 forcing the sheathing member 14 into the channel and under the edge 51 of the raised member 40. This also draws the sheathing member 14 tightly to stretch the sheathing member between the adjacent elongate member 18. The second element 20 can be pushed into the channel 44 either simultaneously with the other element or separately in order to pull the sheathing member tightly over the raised portion 40.

Figure 4:
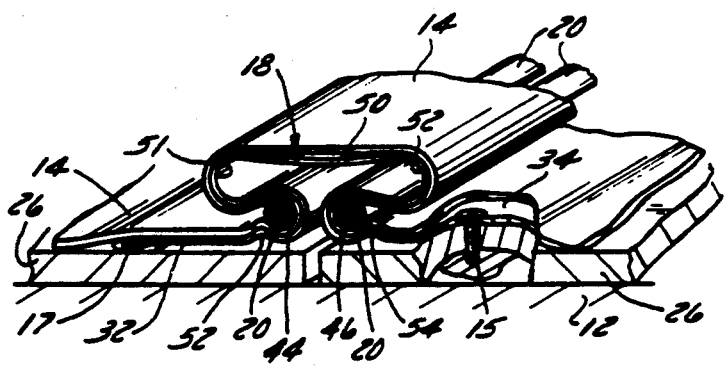
FIG. 4 is a view of the cables positioned in the channels in the raised central portion prior to deformation of the central portion.
Figure 5:
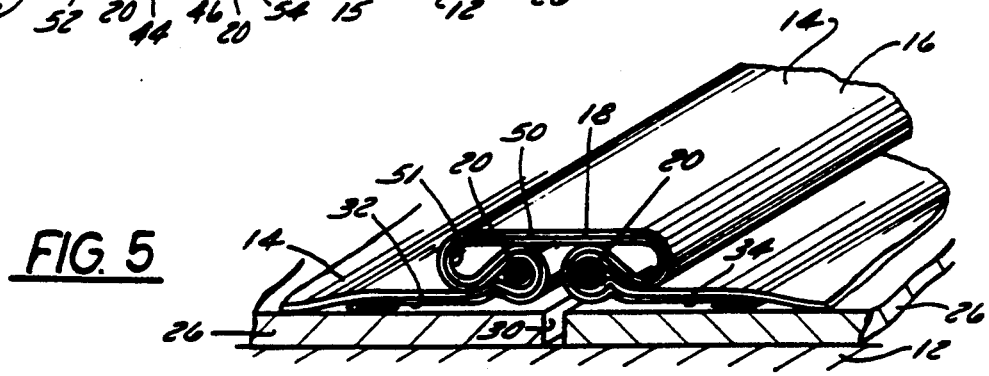
FIG. 5 is a view showing the central portion of the elongate member deformed over the cables.

Once both elements 20 are in the position shown in FIG. 4, the edges 51 and 53 on each side of the center section 50 are forced downward to trap the elements 20 in the channels 42 and 44. This can be accomplished by applying pressure to the top of the edges 51 and 53 to force the edges down and close the channels 42 and 44. The sheathing member which is sandwiched between the cables 20 and the channels 42 and 44 will be locked in place in the elongate member 18. With this arrangement, no punctures will be made in the sheathing material thus eliminating the possibility of water leaks in the sheathing member.

Means can be provided between the first and second portions 32 and 34 and the semi-circular sections 46 and 48 for firmly locking the elements 20 into the deformed channels 42 and 44. Such means is in the form of ridges or ribs 52 and 54. These ribs, as seen in FIG. 4, form a ridge along the length of the elements 20. The ridges 52 and 54 cooperate with the underside of the curved edges 51 and 53 respectively to form a barrier next to the elements 20. If the sheathing member 14 is pulled outwardly from the channels, the barrier will force the elements 20 to move upwardly against the bottom of the deformed edges 51 and 53 to prevent the sheathing member from being pulled out of the channels.

The elongate members 18 can also be used for securing the seams 24 between the segments 22 of the sheathing member 14 to the roof structure. This is accomplished by increasing the size of the channels 42 and 44 in the raised portion 40 of the member 18. The element 20 can also be of a slightly smaller diameter and be pushed into the channels 42 and 44 to lock the seam of the sheathing member in the channels. The raised portion should then be deformed to firmly lock the elements 20 in the channels as described above.

I claim:

1. A waterproof roof including:
    a supporting roof structure,
    a hold down assembly including an elongate member supported by the supporting roof structure,
    said elongate member including a raised center portion having sides,
    a channel in each of said sides,
    a pair of cables having a shape generally conforming to said channels, and
    a generally continuous elastic sheathing member covering said supporting roof structure and overlying said elongate member and being sandwiched in said channels between said pair of cables and said center portion of said elongate member,
    said raised portion being deformed to trap said cables and said sheathing member in said channels.

2. The waterproof roof in accordance with claim 1 including a plurality of said hold down assemblies mounted in a spaced parallel relation on said supporting roof structure.

3. A waterproof roof in accordance with claims 1 or 2, wherein said generally continuous elastic sheathing member comprises ethylene propylene dioxide methane.

4. A waterproof roof in accordance with claims 1 or 2, wherein said generally continuous elastic sheathing member comprises poly vinyl chloride.

5. A waterproof roof including:
    a generally planar supporting roof structure,
    a generally continuous elastic sheathing member covering said supporting roof structure, and
    means for securing said sheathing member to said generally planar supporting roof structure and for reducing slack in said sheathing member, said securing means comprising:
    (a) a plurality of elongate members mounted in a generally spaced relation on said roof structure under said sheathing member, each of said elongate members being secured to said roof structure and including a raised central portion having sides, a semi-circular channel in each of said sides, and
    (b) an elongate element in each of said channels and having a configuration conforming to the shape of said channel said raised center portion being deformed to close said channels with said elongate elements being trapped in said channels with said elastic sheathing member sandwiched between said elongate element and said elongate member.

6. The waterproof roof according to claim 5 wherein said trapping means comprises a section of said central portion which is deformed to close said channel whereby said element is trapped in said channel.

7. A method for securing a generally continuous sheathing member to a supporting roof structure comprising the steps of:
    mounting a number of elongate members in a parallel spaced relation on the supporting roof structure,
    each of said elongate members including a channel on each side,
    laying the sheathing member on the supporting roof structure over the elongate members,
    tucking the sheathing member into the channels by inserting cables into the channels with the sheathing member sandwiched between the cables and the elongate member, and
    deforming the elongate member to trap the cables in the channels.

8. A waterproof roof including:
    a generally planar supporting roof structure;
    a generally continuous elastic sheathing member covering said supporting roof structure;

and an elongate member formed from a continuous elongate metal strip for securing said sheathing member to said roof structure, said strip having first and second planar portions for securing said member to said roof structure and a raised center portion having edges overlying said planar portions said raised center portion having a pair of semi-circular portions connecting said edges to said first and second planar portions, said semi-circular portions forming channels between said raised portion and said planar portions, and an elongate element in each of said channels and having a configuration generally conforming to said channel, said sheathing member covering said raised portion and being sandwiched between said semi-circular portions and said elements, said edges of said raised center portion being deformed toward said first and second portions to enclose said elongate elements in said channels.

* * * * *